UNITED STATES PATENT OFFICE.

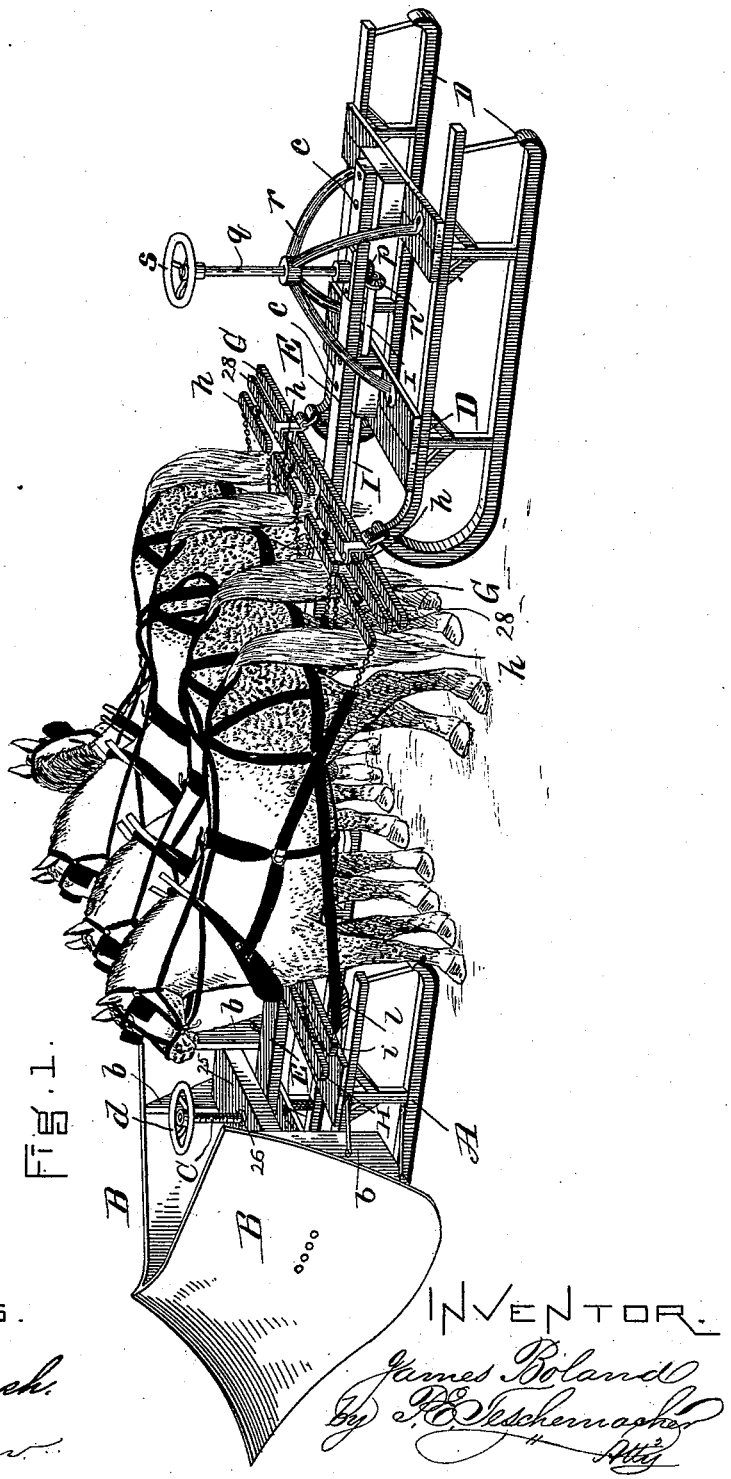

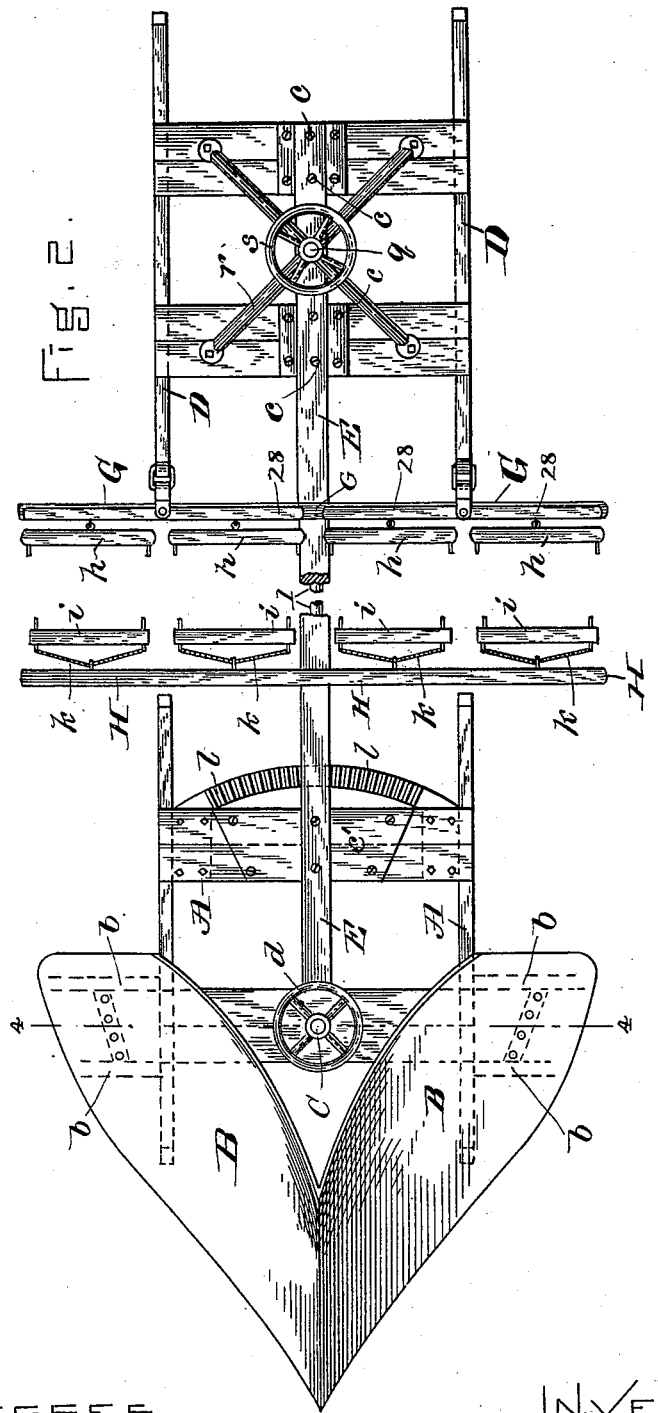

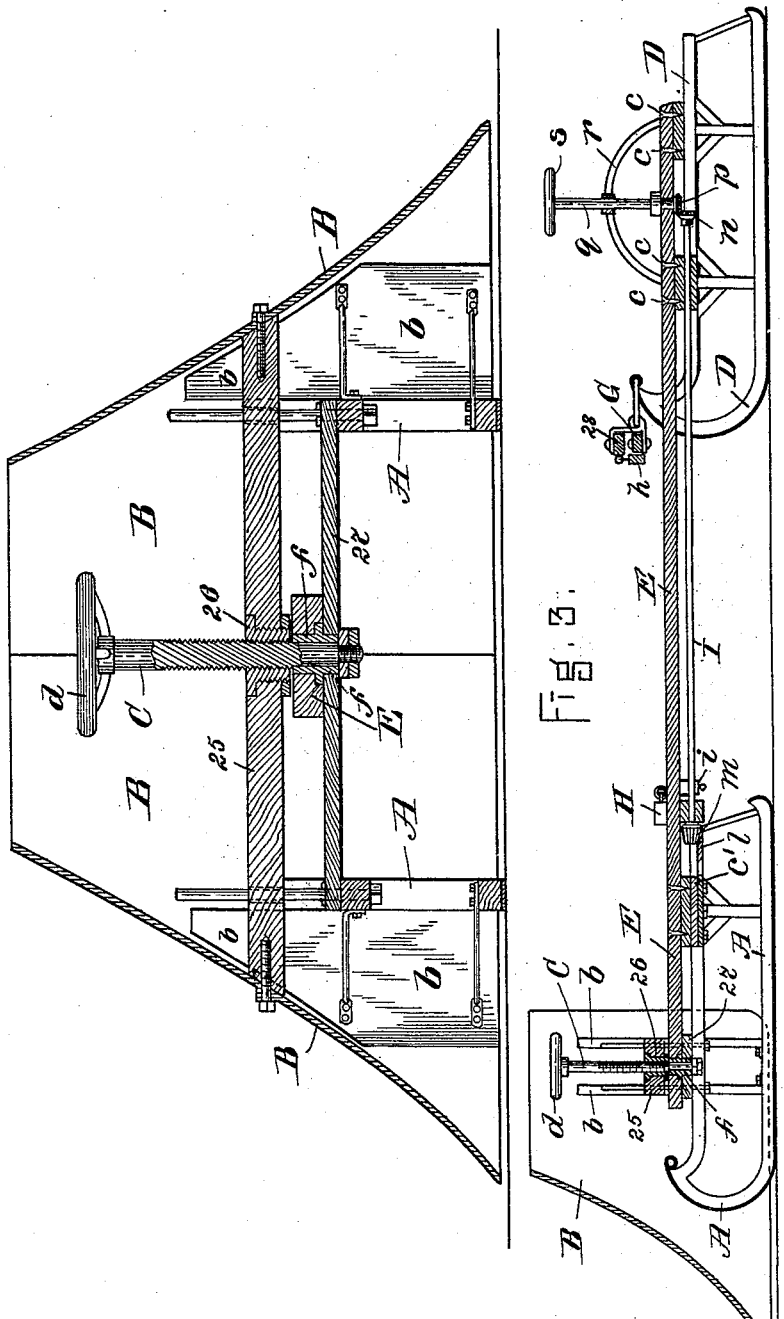

JAMES BOLAND, OF LANCASTER, MASSACHUSETTS.

SNOW-PLOW.

SPECIFICATION forming part of Letters Patent No. 465,235, dated December 15, 1891.

Application filed May 16, 1891. Serial No. 393,010. (No model.)

*To all whom it may concern:*

Be it known that I, JAMES BOLAND, a citizen of the United States, residing at Lancaster, in the county of Worcester and State of Massachusetts, have invented certain Improvements in Snow-Plows, of which the following is a full, clear, and exact description.

Reference is had to the accompanying drawings, making part of this specification, in which—

Figure 1 is a perspective view of my improved snow-plow. Fig. 2 is a plan view of the same, partially broken away. Fig. 3 is a central longitudinal vertical section of the same, the device being shown as complete. Fig. 4 is an enlarged transverse vertical section on the line 4 4 of Fig. 2.

My invention has for its object to provide a snow-plow for breaking out highways, &c., in which the horses or draft-animals will be placed behind the plow instead of in front of the same, as usually heretofore, thereby causing a clear and unobstructed path to be left in front of the horses, giving them a better foothold and enabling them to utilize their strength to the best possible advantage in forcing the plow through the snow.

To this end my invention consists in a snow-plow mounted upon a sled or pair of runners connected with a second sled or pair of runners by a stout bar pivoted at its forward end to the front sled, the two sleds being placed in line one behind the other at such distance apart as to afford ample space for the horses or draft-animals which are hitched to the rear sled on either side of the connecting-bar, whereby the force applied by the animals to draw the rear sled will be transmitted through the connecting-bar to the front sled to force the plow attached thereto through the snow, as desired, in combination with certain novel mechanism for raising and lowering the plow on the front sled and turning the same to change its direction, as hereinafter fully set forth and claimed.

In the drawings, A represents a sled or pair of runners, upon which is mounted a snow-plow B, of any suitable shape, said plow being adapted to move on vertical guides *b b*, secured to and rising from each side of the sled outside the runners, as seen in Figs. 1, 3, and 4. Between these guides and adapted to move vertically therein fit the opposite ends of a heavy cross-bar 25, extending across the interior of the plow and bolted thereto at its opposite ends.

C is a vertical screw-shaft passing through a nut 26, secured to and forming a part of the bar 25, said shaft being provided with a hand-wheel *d* and its lower end being secured to and swiveling in a cross-bar 27, forming a portion of the sled A whereby as the screw C is rotated by a man standing upon the sled the plow will be raised or lowered with respect to the sled to vary its height from the ground, as may be desired.

In the rear of the sled A is placed a second sled or pair of runners D, which is connected with the front sled by a stout bar E, immovably secured to the sled D by bolts *c c*, and pivoted at its front end (by means of a tubular king-bolt *f*, surrounding the screw C and immediately beneath the nut 26) to the sled A to enable the latter to be turned to the right or the left by mechanism to be hereinafter described, when the plow is to be swung sidewise to change the direction of its motion, the bar E resting upon a metal friction-plate *c'*, secured to the rear cross-bar of the sled A, which plate supports the bar and steadies the movement of the sled A upon its pivot.

To the tips or front upper ends of the runners of the rear sled D are pivotally secured a transverse bar G and the doubletree 28, to which latter are secured the whiffletrees *h h h h* for the horses, preferably four, which are placed between the two sleds, as seen in Fig. 1, the sled D being held by the bar E at a sufficient distance in the rear of the sled A to afford ample space for the horses which are employed to draw the rear sled, the forward movement of which is transmitted through the rigid bar E to the front sled and plow B, which is thus pushed forward through the snow, clearing a path or way in advance of the horses, giving them a better and firmer foothold, and enabling them to pull to the best possible advantage without wasting their strength in going through deep snow, as is the case when they are hitched to the front of a plow, as has hitherto been customary. The whiffletree-bar G is preferably secured to the front end of the sled D at such a height as to cause the traces to be nearly horizontal when the horses are pulling, whereby the sled D is kept down in its proper position upon the ground.

The holdback-bars $i$ are connected by chains $k$ to a transverse bar H, bolted to the bar E, the force exerted by the horses in backing being thus applied to the bar E in the same manner as to the pole of an ordinary carriage or wagon.

When it is desired to change the direction in which the plow is moving, it is obvious that the front sled A must be swung to the right or left about its pivot-pin or king-bolt $f$, which is accomplished by the driver, who stands upon the rear sled D, in the following manner: To the front sled A is securely bolted a horizontal rack-bar $l$, curved in the arc of a circle, with which meshes a bevel-pinion $m$ at the end of a long horizontal shaft I, extending along the underside of the bar E and supported in suitable bearings depending therefrom. To the opposite or rear end of this shaft I is secured a bevel-pinion $n$, meshing with a pinion $p$ on a vertical shaft $q$, which shaft is supported in suitable bearings in a frame $r$, composed of curved braces bolted to the top of the sled D. Said shaft $q$ is provided at its upper end with a hand-wheel $s$, by turning which the horizontal shaft I will be rotated, and, through the medium of the pinion $m$ and rack-bar $l$, will cause the front sled A, with the plow, to be turned as required, the gearing, which may be proportioned in any suitable manner, enabling the driver to easily operate the plow and at the same time handle the reins, which, although unnecessary for guiding the horses to change the direction of motion of the plow, should be used for controlling the horses and keeping them in their proper positions.

What I claim as my invention, and desire to secure by Letters Patent, is—

1. In a snow-plow, the combination of the two sleds A D, placed in line one behind the other and connected together by a rigid bar E, pivoted at its forward end to the front sled, with sufficient space between the two sleds to admit of the horses or draft-animals being attached to the rear sled, a snow-plow B, mounted upon the front sled and made adjustable vertically in upright guides rising from said front sled, and the screw-shaft C, provided with the hand-wheel $d$ for adjusting the height of the plow, all constructed to operate substantially as set forth.

2. In a snow-plow, the combination of the two sleds A D, placed in line one behind the other and connected together by a rigid bar E, with sufficient space between them for the horses or draft-animals attached to the rear sled, the snow-plow B, mounted upon the front sled, the latter pivoted to the bar E by the king-bolt or pivot $f$, the rack-bar $l$, pinion $m$, horizontal shaft I, pinions $n$ $p$, and the vertical shaft $q$, provided with the hand-wheel $s$ for turning the front sled and plow, all operating substantially as set forth.

3. In a snow-plow, the combination of the two sleds A D, placed in line one behind the other and connected together by a rigid bar E, with a space between them for the horses or draft-animals attached to the rear sled, and the snow-plow B, mounted upon the front sled, the transverse bar G, attached to the upper front ends or tips of the rear sled and provided with whiffletrees $h$, and the transverse bar H, having the holdback-bars $i$, all constructed to operate substantially as set forth.

Witness my hand this 9th day of May, A. D. 1891.

JAMES BOLAND.

In presence of—
H. F. McRAE,
H. B. CHAFFIN.